(12) United States Patent
Axford et al.

(10) Patent No.: US 7,624,215 B2
(45) Date of Patent: Nov. 24, 2009

(54) INTERRUPT CONTROLLER

(75) Inventors: Simon Axford, Cambridge (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 119 days.

(21) Appl. No.: 12/010,401

(22) Filed: Jan. 24, 2008

(65) Prior Publication Data

US 2009/0164817 A1    Jun. 25, 2009

(30) Foreign Application Priority Data

Dec. 19, 2007  (GB)  ................................. 0724765.3

(51) Int. Cl.
*G06F 13/00*    (2006.01)
(52) U.S. Cl. .................. 710/260; 710/261; 710/266; 713/320; 713/321; 713/322; 713/323; 713/324
(58) Field of Classification Search .............. 710/260, 710/261, 266; 713/300, 310, 320, 321, 322, 713/323, 324
See application file for complete search history.

(56) References Cited

U.S. PATENT DOCUMENTS

| | | | |
|---|---|---|---|
| 5,784,628 A | 7/1998 | Reneris | |
| 6,715,017 B2* | 3/2004 | Sesumi | 710/260 |
| 6,898,651 B2* | 5/2005 | Wang et al. | 710/266 |
| 6,968,469 B1 | 11/2005 | Fleischmann et al. | |
| 7,248,146 B1* | 7/2007 | Kammer et al. | 710/260 |
| 7,330,926 B2* | 2/2008 | Ho | 710/311 |
| 2003/0101362 A1 | 5/2003 | Dia | |
| 2006/0034611 A1* | 2/2006 | Li | 398/135 |
| 2007/0143514 A1* | 6/2007 | Kaushik et al. | 710/260 |
| 2008/0189563 A1* | 8/2008 | Itkin | 713/300 |
| 2009/0158068 A1* | 6/2009 | Pudipeddi et al. | 713/323 |

* cited by examiner

*Primary Examiner*—Glenn A Auve
(74) *Attorney, Agent, or Firm*—Nixon & Vanderhye P.C.

(57) ABSTRACT

An interrupt controller for managing interrupt requests comprises interrupt control circuitry in a first domain, the first domain being switchable to a low-power mode, and interrupt request monitoring circuitry in a second domain. The interrupt control circuitry is responsive to a low power request signal received by the interrupt controller to communicate interrupt select information to the interrupt request monitoring circuitry prior to the first domain being switched to a low power mode, the interrupt select information identifying interrupt requests which indicate exit from the low power mode. The interrupt request monitoring circuitry comprises a select information store configured to store the select information communicated to the interrupt request monitoring circuitry by the interrupt control circuitry. The interrupt request monitoring circuitry comprises interrupt inputs for receiving the interrupt requests, and is responsive to a received interrupt request identified by the stored interrupt select information as indicating exit from the low power mode to trigger switching of the first domain out of the low power mode.

21 Claims, 4 Drawing Sheets

INTERRUPT CONTROLLER

BACKGROUND OF THE INVENTION

1. Field of the Invention

This invention relates to an interrupt controller and an interrupt control method. More particularly, embodiments of this invention relate to an interrupt controller and interrupt control method which manage interrupt requests in a low power mode.

2. Description of the Prior Art

In a data processing apparatus, processing logic, for instance a microprocessor, may be responsive to interrupt request signals to interrupt its current operation to service a new operation identified by the interrupt request signals. Handling of these interrupt request signals is usually conducted by an interrupt controller.

For certain applications such as mobile consumer devices, reducing power usage is an important design criterion. In particular, when designing for such applications it is desirable for each component to be configured to save power when not in use. One way of achieving this is to allocate components of a data processing apparatus to different power domains, in dependence on their usage. For instance, a central processing unit CPU could be provided in a first domain which is configured to be powered down to save power when no data or instructions are required to be processed, whereas a memory could be provided in a second domain which is constantly powered to preserve the content of the memory.

In such an arrangement, correct operation of an interrupt controller could be achieved by locating the interrupt controller within the constantly powered domain to ensure that interrupt requests can be handled even when the central processing unit is powered down. The dynamic power consumption of the interrupt controller can in this case be reduced by clock gating when the interrupt controller is not in use, but the static power will still remain due to leakage through the silicon, thereby causing problems for ultra low power designs.

SUMMARY OF THE INVENTION

Viewed from one aspect the present invention provides an interrupt controller for managing interrupt requests, comprising:

interrupt control circuitry in a first domain, said first domain being switchable to a low-power mode; and interrupt request monitoring circuitry in a second domain;

said interrupt control circuitry comprising interrupt inputs for receiving interrupt requests and being configured to selectively output a received interrupt request to data processing logic; wherein said interrupt control circuitry is responsive to a low power request signal received by said interrupt controller to communicate interrupt select information to said interrupt request monitoring circuitry prior to said first domain being switched to a low power mode, said interrupt select information identifying interrupt requests which indicate exit from said low power mode;

said interrupt request monitoring circuitry comprises a select information store configured to store said select information communicated to said interrupt request monitoring circuitry by said interrupt control circuitry; and said interrupt request monitoring circuitry comprises interrupt inputs for receiving said interrupt requests, and is responsive to a received interrupt request identified by said stored interrupt select information as indicating exit from said low power mode to trigger switching of said first domain out of said low power mode.

In this way, the static power consumption of the interrupt controller can be reduced when the interrupt controller is not required to be fully active by switching unused sections of the interrupt controller into a low power mode. In particular, the interrupt control circuitry, which is powered in the first domain, can be switched into a low power mode, thereby saving power, while incoming interrupt requests can continue to be monitored by interrupt request monitoring circuitry, which is powered in the second domain. The first domain, and thus the interrupt control circuitry, can be switched out of the low power mode if an interrupt request is received which necessitates handling by the interrupt control circuitry. The relatively complex decision making logic of the interrupt controller, which accordingly uses a relatively large amount of power, can be provided in the interrupt control circuitry, thereby saving a significant amount of power when the interrupt control circuitry is switched into the low power mode. In contrast, the complexity of the interrupt request monitoring circuitry can be kept to a relatively low level, thereby resulting in relatively low power usage even though the interrupt request monitoring circuitry is constantly powered in the second domain. It should be noted that by interrupt we mean any "wake up event", thus as well as conventional interrupts, the interrupt controller is also responsive to resets or other system events such as those required for multi-processor systems.

The low level of complexity of the interrupt request monitoring circuitry can be achieved at least in part because the decision making process of determining which of the monitored interrupts requests should trigger the first domain can be carried out by the interrupt control circuitry. The resulting selection of interrupt requests can then be communicated to the interrupt request monitoring circuitry in response to a low power request signal prior to the interrupt control circuitry being switched into the low power mode. In this way, all that is in principle required of the interrupt control monitoring circuitry is to compare each received interrupt request with the selected interrupt requests communicated to the interrupt control monitoring circuitry, and in the case of a match to trigger the first domain to be switched out of the low power mode.

It will be appreciated that the division of interrupt controller logic between the first domain and the second domain may be provided in many ways. For instance, the first domain may include the interface to the data processing logic and may store the active interrupt state, while the second power domain may include the logic required to determine whether or not an interrupt is to be taken, in particular the priority logic and the pending interrupt state. The second domain may also include a copy of the current priority level, based on active interrupts, which is passed from the first domain to the second domain. In other words, while the decision-making logic for selecting which interrupt requests should indicate exit from the low power mode is preferably provided in the first domain, with a simple mask or list of interrupts being passed to the second domain as the select information, the decision-making logic could instead be provided in the second domain. In this case, the select information may be a copy of the current priority level which is passed from the first domain to the second domain, and which is used to determine the interrupt requests which indicate exit from the low power mode.

The low power mode of the first domain may be achieved in several ways. In one example, switching into the low power mode comprises inhibiting clock signals within the first domain, a technique known as clock gating. In another example, switching into the low power mode comprises powering down the first domain by terminating, or at least inhibiting, the supply of power to the first domain. The multiple domains may be achieved by providing multiple power islands which can be separately powered up and down. This may increase complexity at implementation time compared with the clock gating methods of reducing power consumption in the domains, but the degree of power reduction possible may be worth the increase in complexity for some low power applications.

Preferably the second domain will be constantly powered to ensure continuous operation of the interrupt request monitoring circuitry. Alternatively, the second domain may be subject to an alternative power control regime which permits at least some degree of monitoring of incoming interrupt request signals but still enables power savings to be made in the second domain. Under certain circumstances (such as if the interrupt controller as a whole is to be switched off), the second domain may be powered down completely.

It may not be necessary for the interrupt request monitoring circuitry to monitor all incoming interrupt requests. It may be the case that certain interrupt request signal lines correspond to interrupt requests which will never require the interrupt control circuitry to be powered up, for instance because they have a relatively low level of importance. In this case, the interrupt request monitoring circuitry may receive only a subset of the interrupt requests received by the interrupt control circuitry.

Two main types of interrupt request can be considered. A level interrupt is applied on an interrupt request signal line until it is serviced, whereas a pulse interrupt is applied on an interrupt request signal line as a finite duration pulse. For the purpose of handling a level interrupt, the interrupt request monitoring circuitry simply needs to trigger the switching of the first domain out of the low power mode, because the interrupt control circuitry will be able to access the level interrupt on its interrupt request signal line when it has switched out of the low power mode. However, for a pulse interrupt the pulse is likely to have expired before the interrupt control circuitry is able to read its interrupt request signal line. Accordingly, in this case the interrupt request monitoring circuitry is responsive to receiving a pulse interrupt request indicating exit from the low power mode to communicate an interrupt identifying signal to the interrupt control circuitry following switching of the first domain out of the low power mode. The interrupt identifying signal indicates to the interrupt control circuitry which of the interrupt requests have been received.

The interrupt controller may comprise comparison circuitry which is responsive to a received interrupt request to compare the received interrupt request with the stored interrupt select information to determine whether the received interrupt request indicates exit from the low power mode.

The interrupt controller may be provided as a discrete component, or alternatively may be provided as part of a data processing apparatus. Such a data processing apparatus may comprise data processing logic which is powered in the first domain. The interrupt control circuitry and the data processing logic work together on the servicing of interrupt requests, and the function of the interrupt control circuitry to determine which interrupt requests to pass to the data processing logic for servicing would not be useful while the data processing logic is switched off. It is therefore beneficial that the interrupt control circuitry be provided in the same domain as the data processing logic. The data processing logic may be a central processing unit, or a secondary processing unit such as a coprocessor.

The data processing apparatus may comprise a power controller which is responsive to a low power request signal to switch the first domain into the low power mode and which is responsive to a trigger signal from the interrupt request monitoring circuitry to switch the first domain out of the low power mode. Alternatively, the power controller may be provided externally to the data processing apparatus.

The data processing apparatus may also comprise a memory coupled to the data processing logic for storing data generated by the data processing logic and data to be processed by the data processing logic. The memory would preferably be powered in the second domain to ensure that the contents of the memory would be preserved in the event that the first domain is switched to the low power mode. This property of the memory in the second domain is particularly advantageous where the data processing logic is responsive to the low power request signal to store an operating state of the data processing logic in the memory prior to the first domain being switched into the low power mode. In this case, when the first domain is switched out of the low power mode, the data processing logic can be re-initialised using the stored operating state to permit the operation which was ongoing when the first domain was switched into the low power mode to be resumed.

Viewed from another aspect the present invention provides a method of managing interrupt requests made to data processing logic powered in a first domain, said first domain being switchable to a low-power mode, comprising the steps of:

receiving, at interrupt control circuitry powered in said first domain, said interrupt requests, and selectively providing one of said received interrupt requests to said data processing logic;

communicating interrupt select information from said interrupt control circuitry to interrupt request monitoring circuitry powered in a second domain, said interrupt select information identifying interrupt requests which indicate exit from said low power mode;

storing said select information communicated to the interrupt request monitoring circuitry into a select information store; and receiving, at said interrupt request monitoring circuitry, said interrupt requests, and triggering switching of said first domain into said low power mode in response to a received interrupt request at said interrupt request monitoring circuitry identified by said stored interrupt select information as indicating exit from said low power mode.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
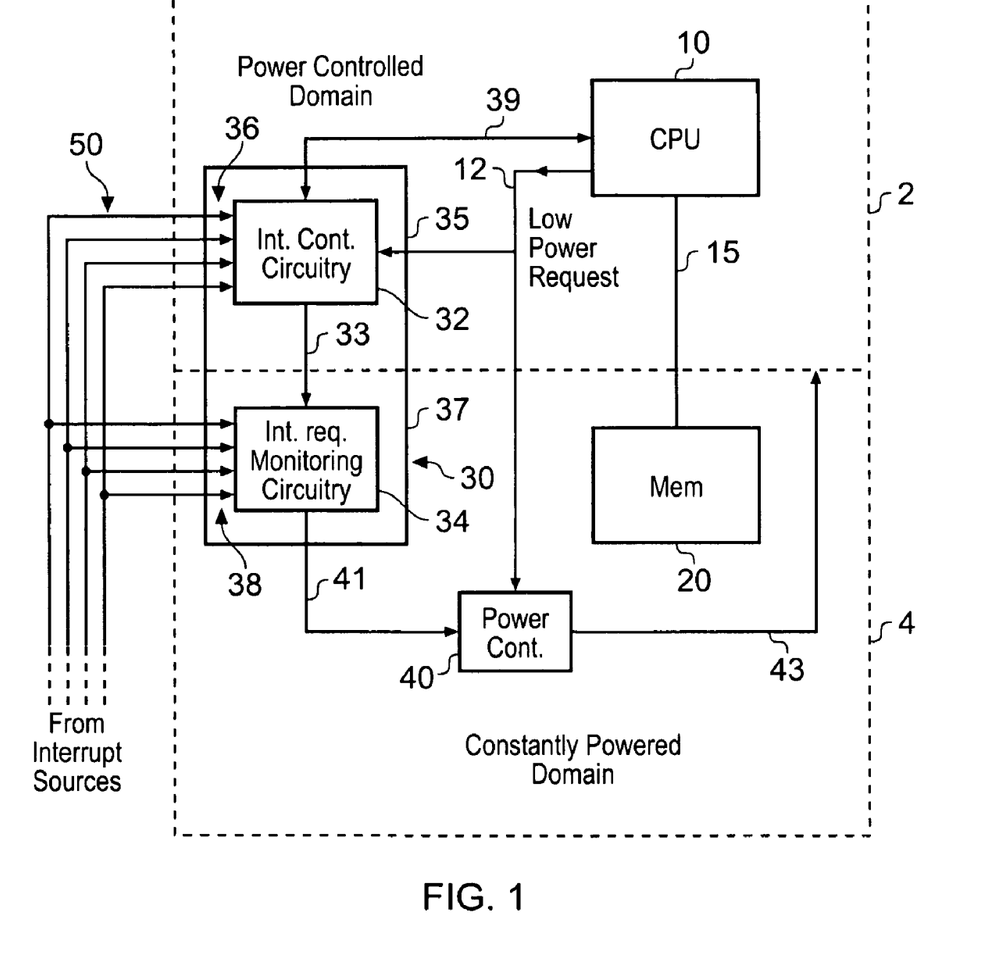
FIG. 1 schematically illustrates an integrated circuit comprising data processing logic and an interrupt controller.

In FIG. 1, there is schematically illustrated an integrated circuit which is divided into two power domains. In particular, a power controlled domain 2 is provided which can be powered down in order to save power in a low power mode, and a constantly powered domain 4 is provided, which is not powered down in the low power mode. By dividing up the integrated circuit in this way, components of the integrated circuit which can safely be powered down when not required can be provided within the power controlled domain 2, while components which must be constantly powered in order to ensure correct functioning of the integrated circuit can be provided in the constantly powered domain 4.

In the power controlled domain 2, there is provided a central processing unit 10 for processing instructions and data. The central processing unit 10 can be powered down when no instructions and/or data are pending for processing without losing data or impeding function. Alternatively, the central processing unit 10 can be powered down when instructions and/or data are being processed without losing a current processing task by storing a copy of the current state of the system to a memory before powering down the power controlled domain 2. Accordingly, the central processing unit 10 can readily be provided within the power controlled domain 2.

In the constantly powered domain 4, there is provided a memory 20, coupled to the central processing unit 10 via an address and data bus 15, which stores data generated by, or for use by, the central processing unit 10. It will be appreciated that the memory 20 is present in the constantly powered domain 4 in order that the contents of the memory 20 can be preserved when the low powered mode is entered. This is particularly important where a current operating state of the system, and in particular of the central processing unit 10, is stored into the memory 20 before the power controlled domain switches into the low power mode to enable resumption of process by the central processing unit 10 at a later time.

The constantly powered domain 4 also includes a power controller 40 which is configured to power down the power controlled domain in response to a low power request signal issued to the power controller 40 from the central processing unit 10 on a low power request signal line 12. The power controller 40 is configured to apply power to the power controlled domain via a power line 43.

The integrated circuit also includes an interrupt controller 30 which handles interrupt requests issued by a plurality of interrupt sources for servicing by the central processing unit 10. The interrupt sources may include components of the integrated circuit, external off-chip sources, or software generated interrupts. In contrast to the other components of the integrated circuit, the interrupt controller 30 is not provided solely within one power domain, but is instead distributed across both the power controlled domain 2 and the constantly powered domain 4. More specifically, a first portion 35 of the interrupt controller 30 is provided within the power controlled domain 2, while a second portion 37 of the interrupt controller 30 is provided within the constantly powered domain 4. In this way, functional components of the interrupt controller 30 which can be powered down when not in use without compromising the operation of the interrupt controller 30 can be provided within the first portion 35, that is, within the power control domain 2, while the remaining functional components of the interrupt controller 30, which cannot be powered down without compromising the operation of the interrupt controller 30, are provided within the second portion 37, that is, within the constantly powered domain 4.

More particularly, the first portion 35 of the interrupt controller 30, provided within the power controlled domain 2, comprises interrupt control circuitry 32 which has interrupt inputs for receiving interrupt request signals from the interrupt sources, and which determines which, if any, of these interrupt request signals should be passed to the central processing unit 10 over an interrupt request interface 39. The interrupt control circuitry 32 includes prioritisation logic for assigning priorities to particular interrupt request signals and the decision making logic capable of selecting interrupt requests for communication to the central processing unit 10 on the basis of currently applied interrupt request signals, the respective priorities assigned to the interrupt request signals by the prioritisation logic, and current operating conditions of the central processing unit 10. The interrupt control circuitry 32 is configured to provide the selected interrupt request signals to the central processing unit 10 via the interrupt request interface 39. It will be understood that the interrupt control circuitry 32 will be powered down when the first domain is switched into the low power mode.

Certain interrupt requests relate to processing tasks which are sufficiently important that the central processing unit 10 and the interrupt control circuitry 32 should be powered up out of the low power mode in order to service the interrupt request. The determination and selection of which interrupt requests should cause the low power mode to be exited is made by the interrupt control circuitry 32 in response to the low power request signal issued by the central processing unit 10 on the low power request signal line 12. The selected interrupt requests are then communicated from the interrupt control circuitry 32 to the second portion 37 of the interrupt controller 30 via an interrupt request identifying signal line 33 prior to the power controlled domain 2 being powered down. In this way, the second portion 37 of the interrupt controller 30 is provided with select information identifying interrupt requests which should cause the low power mode to be exited before the first portion 35 of the interrupt controller 30 is powered down.

The second portion 37 of the interrupt controller 30, provided within the constantly powered domain 4, comprises interrupt request monitoring circuitry 34 which has interrupt inputs 38 for receiving interrupt request signals, and which monitors the received interrupt request signals issued by the interrupt sources on the interrupt request signal lines 50. The interrupt request monitoring circuitry 34 compares each received interrupt request with the select information communicated to the second portion 37 of the interrupt controller 30 by the interrupt control circuitry 32. In the case of a match, the interrupt request monitoring circuitry 34 is configured to issue a power up request signal to the power controller 40 on a power up request signal line 41. In response, the power controller 40 is configured to power up the power control domain thereby activating both the central processing unit 10 and the interrupt control circuitry 32 to enable the interrupt request to be serviced.

Figure 2:
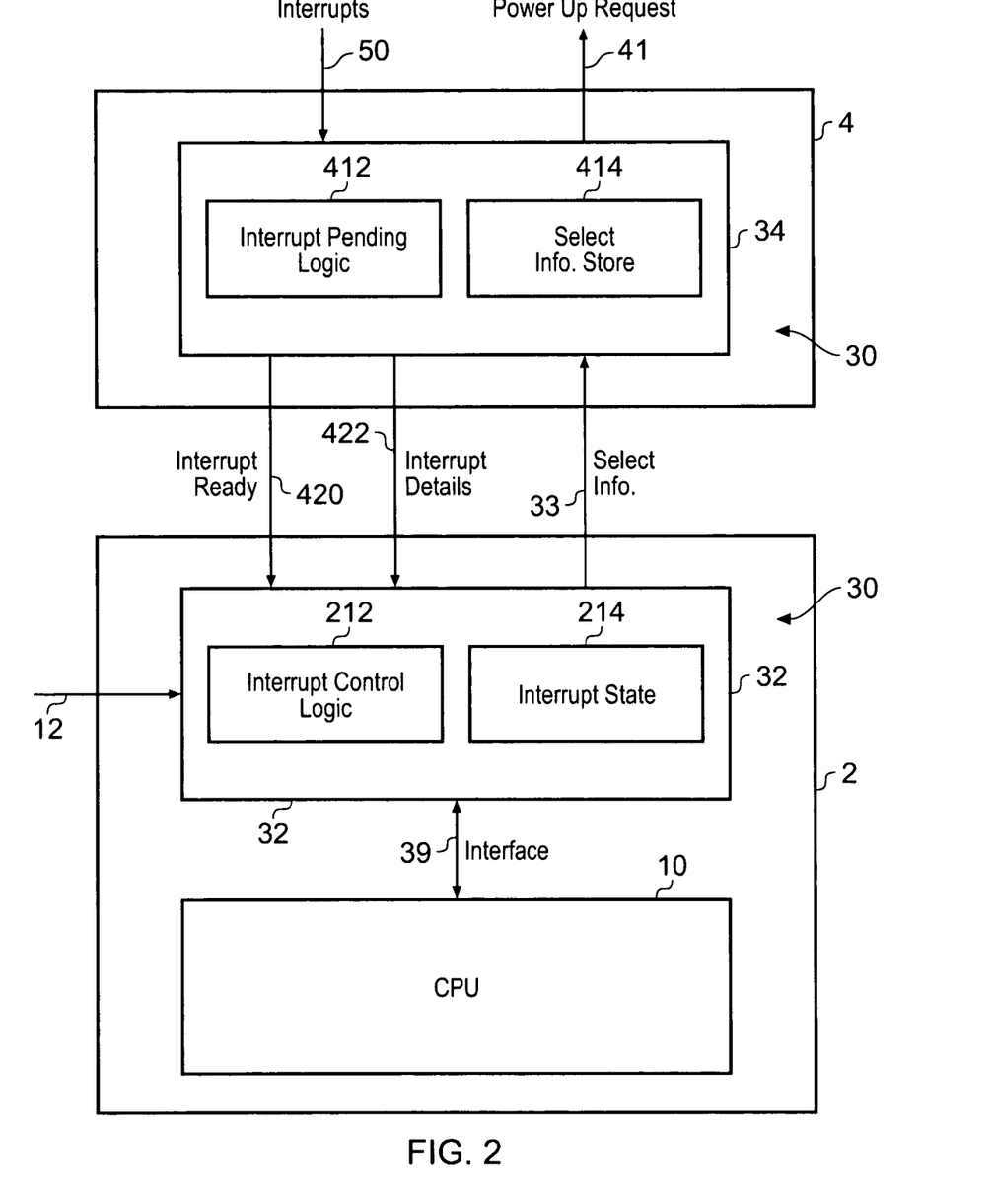
FIG. 2 schematically illustrates an interrupt controller which is distributed across a constantly powered domain and a power controlled domain.

In FIG. 2, a more detailed implementation of the distribution of the interrupt controller 30 across the constantly powered domain 4 and the power control domain 2 is schematically illustrated. As with FIG. 1, the power controlled domain 2 comprises a central processing unit 10 and the interrupt control circuitry 32 of the interrupt controller 30. An interrupt request interface 39 is provided between the central processing unit 10 and interrupt control circuitry 32 to enable the interrupt controller 30 to communicate interrupt requests to the central processing unit 10, and to enable the central processing unit to communicate control data to the interrupt controller 30. The interrupt control circuitry 32 comprises interrupt control logic 212 and an interrupt state store 214. The interrupt state store 214 stores the current interrupt state of the interrupt controller 30. In particular, the interrupt state store 214 holds information indicating which interrupt requests are currently pending at the interrupt controller 30, and any priority information associated with such requests. The interrupt control logic 212 is configured to determine, from the stored interrupt state information in the interrupt state store 214 and the current operating state of the central processing unit 10, which, if any, of the currently pending interrupt requests should be passed to the central processing unit 10 for servicing. The interrupt control logic 212 is also responsive to a low power request signal received on the low power request line 12, to determine, in dependence on the current interrupt state, which interrupt requests should cause the power control domain to exit from the low power mode. The selected interrupt requests are then communicated to the interrupt request monitoring circuitry 34 of the interrupt controller 30 via a select information signal line 33.

The interrupt request monitoring circuitry 34, which is provided within the constantly powered domain, comprises interrupt pending logic 412 and a select information store 414. The select information store 414 serves to store the select information communicated from the interrupt control circuitry 32 via the select information signal line 33. The interrupt pending logic 412 serves to monitor interrupts received from interrupt sources over the interrupt request signal lines 50, and to apply a power up request signal on the power up request signal line 41 in the event that one of the received interrupts is identified as indicating exit from low power mode in the select information stored in the select information store 414. The interrupt pending logic 412 may take the form of comparison circuitry which compares received interrupts with the select information provided within the select information store 414 and which causes the power up request signal to be outputted in the event of a match between the interrupt requests indicated in the select information store 414 and a received interrupt. When the power up request signal has been asserted on the power up request signal line 41, and when the power controlled domain 2 has been powered up to exit the low power mode, the interrupt request monitoring circuitry 34 communicates an interrupt ready signal to the interrupt control circuitry 32 on an interrupt ready signal line 420, and communicates interrupt details indicative of which interrupt request has been received to the interrupt control circuitry 32 on an interrupt detail signal line 422. The provision of the interrupt ready signal line 420 and the interrupt detail signal line 422 is particularly important for dealing with pulse interrupts, which may have expired at the interrupt request signal lines 50 by the time that the power controlled domain, and thus the interrupt control circuitry 32, have been powered up. In the case of level interrupts, the interrupt ready signal line 420 and the interrupt detail signal line 422 are optional, because the interrupt control circuitry can determine the received interrupts by looking at the signals provided on the interrupt request signal lines 50 directly.

Figure 3:
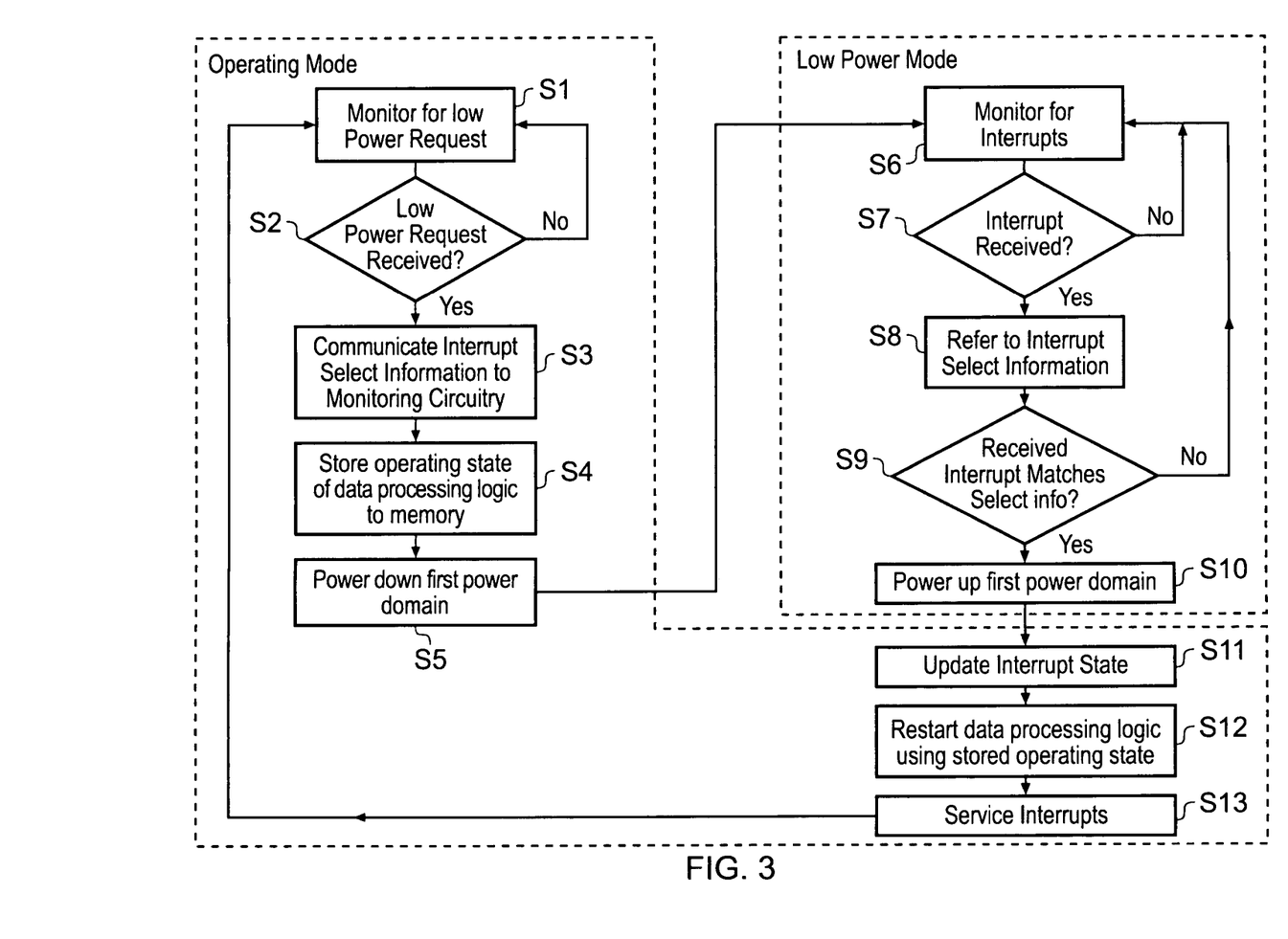
FIG. 3 is a schematic flow diagram illustrating an operating mode and a low power mode of an interrupt controller.

Referring now to FIG. 3, an example operation of an interrupt controller as described in FIGS. 1 and 2 above is described. In FIG. 3, the operation of the interrupt controller is illustrated for both an operating mode of the power control domain, in which the power controlled domain has been powered up, and for a low power mode of the power controlled domain, in which the power controlled domain has been powered down. In the operating mode, at a step S1, the interrupt control circuitry 32 monitors for a low power request from the data processing logic, in this case central processing unit 10, while normal operations are ongoing. At a step S2, it is determined whether or not a low power request has been received. If a low power request has not been received at the S2, processing returns to the step S1. If on the other hand a low power request has been received from the central processing unit 10, the interrupt control circuitry 32 generates interrupt select information on the basis of the present interrupt state and communicates the interrupt select information to the interrupt request monitoring circuitry 34 at a step S3. Then, at a step S4 a current operating state of the central processing unit 10 is stored into the memory 20 for later retrieval when the central processing unit 10 is powered back up. It will be appreciated that the step S3 and the step S4 could be executed in any order, or could be executed concurrently. Then, when the steps S3 and S4 have been completed, the power controlled domain is powered down and enters the low power mode at a step S5.

In the low power mode, at a step S6 the interrupt request monitoring circuitry 34 monitors for interrupts on the interrupt request signal lines 50 at a step S7, where it is determined whether any interrupts have been received on the interrupt request signal lines 50. If no interrupt request signals have been received, processing returns to the step S6. However, if one or more interrupt request signals have been received, the interrupt request monitoring circuitry 34 refers to the interrupt select information to determine which interrupt requests are indicative of an exit from the low power mode. Then, at a step S9 the received interrupt requests are compared with the interrupt select information to determine whether the received interrupt request is indicative of exit from the low power mode. If a received interrupt request is not indicative of an exit from the low power mode, processing returns to the step S6. Alternatively, if a received interrupt request is determined to be indicative of exit from the low power mode, the interrupt request monitoring circuitry applies a power up request signal to the power up request signal line 41 to trigger exit from the low power mode, thereby powering up the power controlled domain.

At this point processing returns to the operating mode, and to a step S11 where the interrupt state of the interrupt controller is updated and stored into the interrupt state store 214. Then at a step S12, the stored operating state is retrieved from memory and used to reinitialise the central processing unit 10. It will be appreciated that the step S11 and the step S12 could be carried out in any order, or could be carried out concurrently. Then, at a step S13 the received interrupt requests are serviced by the interrupt control circuitry 32 and the central processing unit 10. Processing then returns to the step S1.

Figure 4:
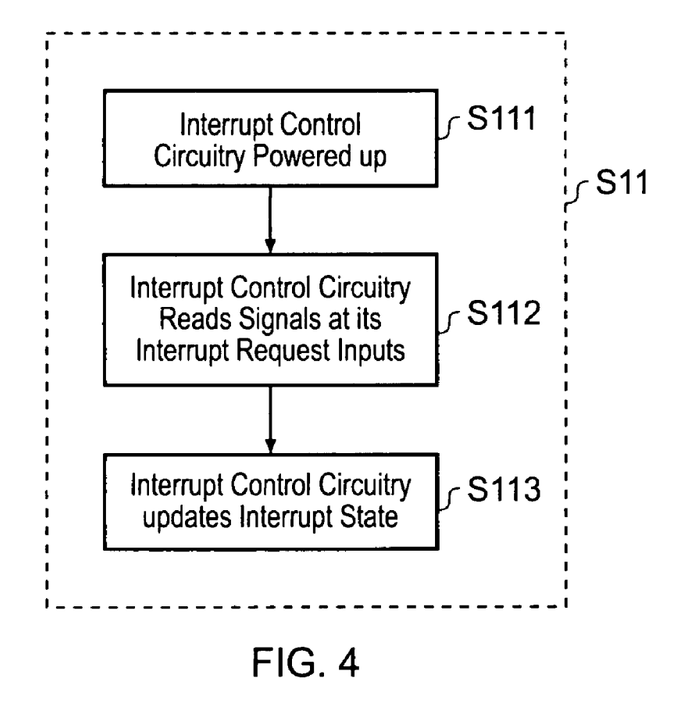
FIG. 4 is a schematic flow diagram illustrating a process for updating the interrupt state of an interrupt controller upon receipt of a level interrupt request signal.

Referring now to FIG. 4, the step S11 described in FIG. 3 is further explained with reference to the case of level interrupt requests being received on the interrupt request signal lines 50. In this case, at a step S111 the interrupt request circuitry 32, being in the power controlled domain, is powered up. Then, at a step S112, the interrupt control circuitry 32 reads signals at its interrupt request inputs 36 and updates the interrupt state of the control circuitry 30 at a step S113. This is possible because the level interrupt is assumed to be applied to the interrupt request signal lines 50 both when the interrupt request monitoring circuitry detects the interrupt request and also when the interrupt control circuitry has powered up out of the low power mode.

Figure 5:
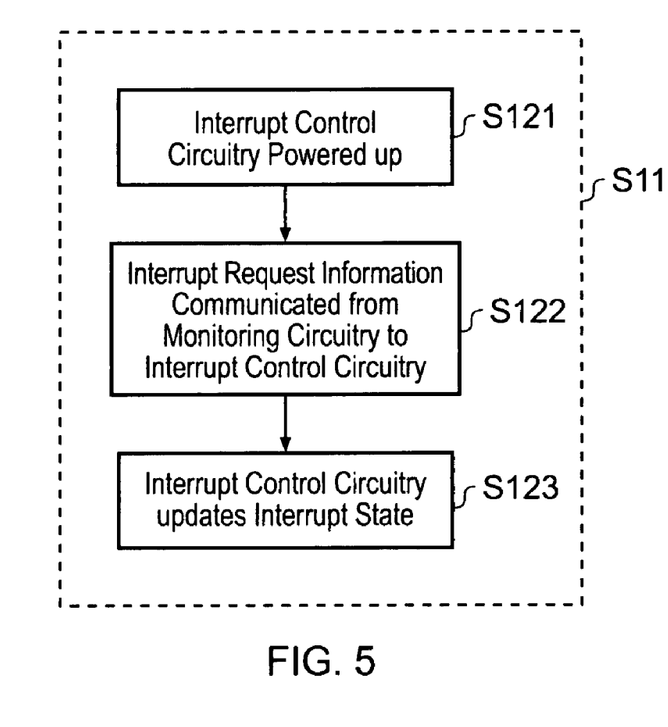
FIG. 5 is a schematic flow diagram illustrating a process for updating the interrupt state of an interrupt controller upon receipt of a pulse interrupt request signal.

Referring to FIG. 5, the step S11 of FIG. 3 is further described with reference to the case in which the received interrupt requests are pulse interrupts. In this case, at a step S121 the interrupt control circuitry 32, being in the power controlled domain, is powered up. Then, at a step S122 interrupt request information describing the interrupt request received by the interrupt request monitoring circuitry is communicated from the interrupt request monitoring circuitry to the interrupt control circuitry 32. The interrupt control circuitry 32 then updates the interrupt state of the interrupt controller 30 in dependence on the communicated interrupt information at a step S123. This procedure is used in the case of pulse interrupts because the pulse interrupt is likely to no longer be present on the interrupt request signal lines 50 by the time the interrupt control circuitry has powered up out of the low power mode.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An interrupt controller for managing interrupt requests, comprising:
    interrupt control circuitry in a first domain, said first domain being switchable to a low-power mode; and
    interrupt request monitoring circuitry in a second domain;
    said interrupt control circuitry comprising interrupt inputs for receiving interrupt requests and being configured to selectively output a received interrupt request to data processing logic; wherein
    said interrupt control circuitry is responsive to a low power request signal received by said interrupt controller to communicate interrupt select information to said interrupt request monitoring circuitry prior to said first domain being switched to a low power mode, said interrupt select information identifying interrupt requests which indicate exit from said low power mode;
    said interrupt request monitoring circuitry comprises a select information store configured to store said select information communicated to said interrupt request monitoring circuitry by said interrupt control circuitry; and
    said interrupt request monitoring circuitry comprises interrupt inputs for receiving said interrupt requests, and is responsive to a received interrupt request identified by said stored interrupt select information as indicating exit from said low power mode to trigger switching of said first domain out of said low power mode.

2. An interrupt controller according to claim 1, wherein switching into said low power mode comprises powering down said first domain.

3. An interrupt controller according to claim 1, wherein switching into said low power mode comprises inhibiting clock signals within said first domain.

4. An interrupt controller according to claim 1, wherein said second domain is constantly powered.

5. An interrupt controller according to claim 1, wherein said interrupt request monitoring circuitry receives a subset of the interrupt requests received by said interrupt control circuitry.

6. An interrupt controller according to claim 1, wherein said interrupt request monitoring circuitry is responsive to receiving a pulse interrupt request indicating exit from said low power mode to communicate an interrupt identifying signal to said interrupt control circuitry following switching of said first domain out of said low power mode,
    said interrupt identifying signal indicating to said interrupt control circuitry which of said interrupt requests has been received.

7. An interrupt controller according to claim 1, comprising comparison circuitry responsive to a received interrupt request to compare said received interrupt request with said stored interrupt select information to determine whether said received interrupt request indicates exit from said low power mode.

8. A data processing apparatus comprising an interrupt controller according to claim 1.

9. A data processing apparatus according to claim 8, comprising
    data processing logic powered in said first domain.

10. A data processing apparatus according to claim 8, comprising
    a power controller responsive to a low power request signal to switch said first domain into said low power mode and responsive to a trigger signal from said interrupt request monitoring circuitry to switch said first domain out of said low power mode.

11. A data processing apparatus according to claim 9, comprising:
    a memory coupled to said data processing logic, said memory being powered in said second domain.

12. A data processing apparatus according to claim 11, wherein said data processing logic is responsive to said low power request signal to store an operating state of said data processing logic in said memory prior to said first domain being switched into said low power mode.

13. A method of managing interrupt requests made to data processing logic powered in a first domain, said first domain being switchable to a low-power mode, comprising the steps of:
    receiving, at interrupt control circuitry powered in said first domain, said interrupt requests, and selectively providing one of said received interrupt requests to said data processing logic;
    communicating interrupt select information from said interrupt control circuitry to interrupt request monitoring circuitry powered in a second domain, said interrupt select information identifying interrupt requests which indicate exit from said low power mode;
    storing said select information communicated to the interrupt request monitoring circuitry into a select information store; and
    receiving, at said interrupt request monitoring circuitry, said interrupt requests, and triggering switching of said first domain into said low power mode in response to a received interrupt request at said interrupt request monitoring circuitry identified by said stored interrupt select information as indicating exit from said low power mode.

14. A method of managing interrupt requests according to claim 13, wherein switching into said low power mode comprises powering down said first domain.

15. A method of managing interrupt requests according to claim 13, wherein switching into said low power mode comprises inhibiting clock signals within said first domain.

16. A method of managing interrupt requests according to claim 13, wherein said second domain is constantly powered.

17. A method of managing interrupt requests according to claim 13, comprising receiving a subset of the interrupt requests received by said interrupt control circuitry at said interrupt request monitoring circuitry.

18. A method of managing interrupt requests according to claim 13, comprising the step of communicating an interrupt identifying signal from said interrupt request monitoring circuitry to said interrupt control circuitry following switching of said first domain out of said low power mode in response to receiving a pulse interrupt request indicating exit from said low power mode, said interrupt identifying signal indicating to said interrupt control circuitry which of said interrupt requests has been received.

19. A method of managing interrupt requests according to claim 13, comprising the steps of:

switching said first domain into said low power mode in response to a low power request signal; and switching said first domain out of said low power mode in response to a trigger signal from said interrupt request monitoring circuitry.

20. A method of managing interrupt requests according to claim 19, comprising the step of storing an operating state of said data processing logic into a memory in response to said low power request signal prior to said first domain being switched into said low power mode.

21. An interrupt controller for managing interrupt requests, comprising:

interrupt control means in a first domain, said first domain being switchable to a low-power mode; and interrupt request monitoring means in a second domain;

said interrupt control means comprising interrupt inputs for receiving interrupt requests and being configured to selectively output a received interrupt request to a data processing means; wherein said interrupt control means is responsive to a low power request signal received by said interrupt controller to communicate interrupt select information to said interrupt request monitoring means prior to said first domain being switched to a low power mode, said interrupt select information identifying interrupt requests which indicate exit from said low power mode;

said interrupt request monitoring means comprises select information storing means for storing said select information communicated to said interrupt request monitoring means by said interrupt control means; and said interrupt request monitoring means comprises interrupt inputs for receiving said interrupt requests, and is responsive to a received interrupt request identified by said stored interrupt select information as indicating exit from said low power mode to trigger switching of said first domain out of said low power mode.

* * * * *